(12) United States Patent
Northcutt et al.

(10) Patent No.: US 12,483,266 B2
(45) Date of Patent: *Nov. 25, 2025

(54) OBJECT DETECTION IMPROVEMENT BASED ON AUTONOMOUSLY SELECTED TRAINING SAMPLES

(71) Applicant: TOYOTA RESEARCH INSTITUTE, INC., Los Altos, CA (US)

(72) Inventors: Brandon Northcutt, Arlington, MA (US); Katarina Bouma, Palo Alto, CA (US); Kevin Stone, Palo Alto, CA (US); Konstantine Mushegian, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 18/098,618

(22) Filed: Jan. 18, 2023

(65) Prior Publication Data

US 2023/0283925 A1 Sep. 7, 2023

Related U.S. Application Data

(63) Continuation of application No. 16/854,768, filed on Apr. 21, 2020, now Pat. No. 11,610,080.

(51) Int. Cl.
| | |
|---|---|
| *G06K 9/62* | (2022.01) |
| *H03M 1/56* | (2006.01) |
| *H03M 7/16* | (2006.01) |
| *H04N 25/75* | (2023.01) |
| *H03K 19/20* | (2006.01) |
| *H03K 19/21* | (2006.01) |

(52) U.S. Cl.
CPC ............... *H03M 7/16* (2013.01); *H03M 1/56* (2013.01); *H04N 25/75* (2023.01); *H03K 19/20* (2013.01); *H03K 19/21* (2013.01)

(58) Field of Classification Search
CPC .. G06K 9/6257; G06K 9/6226; G06K 9/6264; G06K 9/627; G06N 3/08
See application file for complete search history.

(56) References Cited

U.S. PATENT DOCUMENTS

| | | | |
|---|---|---|---|
| 9,076,065 B1 * | 7/2015 | Vijayanarasimhan | ........................ G06V 10/774 |
| 11,200,454 B1 * | 12/2021 | Qian | ..................... G06V 10/776 |
| 11,610,080 B2 | 3/2023 | Northcutt et al. | |
| 2016/0125274 A1 * | 5/2016 | Zhou | ....................... G06F 18/24 382/160 |

(Continued)

*Primary Examiner* — Fayyaz Alam
(74) *Attorney, Agent, or Firm* — Seyfarth Shaw LLP (57) ABSTRACT

A method for training an object detection system includes estimating a location of a first object in an environment based on a density cluster map generated from a plurality of images of the environment. The method also includes generating one or more negative training samples of the first object in the environment based on the plurality of images, each of the one or more negative training samples corresponding to a second object at a location in the environment that is different than the estimated location of the first object. The method further includes generating positive training samples from a set of images of the first object. The method also includes training the object detection system to detect the first object based on the positive training samples and the negative training sample.

20 Claims, 9 Drawing Sheets

(56) References Cited

U.S. PATENT DOCUMENTS

| | | | |
|---|---|---|---|
| 2016/0188633 A1* | 6/2016 | Wang | G06F 16/9535 |
| | | | 707/728 |
| 2020/0159937 A1* | 5/2020 | Schondorf | G06F 21/554 |
| 2020/0387755 A1* | 12/2020 | Hagen | G06F 18/2155 |
| 2021/0190536 A1* | 6/2021 | Gil Casals | G01C 21/3841 |

* cited by examiner

OBJECT DETECTION IMPROVEMENT BASED ON AUTONOMOUSLY SELECTED TRAINING SAMPLES

CROSS-REFERENCE TO RELATED APPLICATION

The present application is a continuation of U.S. patent application Ser. No. 16/854,768, filed on Apr. 21, 2020, and titled "OBJECT DETECTION IMPROVEMENT BASED ON AUTONOMOUSLY SELECTED TRAINING SAMPLES," the disclosure of which is expressly incorporated by reference in its entirety.

BACKGROUND

Field

Certain aspects of the present disclosure generally relate to object detection and, more particularly, to a system and method for improving object detection systems by autonomously selecting positive and negative training samples.

Background

Conventional object detection systems are trained with training samples. The training samples include positive and negative samples. The training samples may be labeled by a human. Manually labeling training samples is time consuming and error prone. It is desirable to improve object detection system by improving the process for generating training samples.

SUMMARY

In one aspect of the present disclosure, a method for generating positive and negative training samples is disclosed. The method includes identifying false positive images of an object based on multiple mages of an environment. The method also includes generating positive training samples from a set of images of the object. The method further includes generating a negative training sample from the false positive image. The method still further includes training an object detection system based on the positive training samples and the negative training sample In another aspect of the present disclosure, a non-transitory computer-readable medium with non-transitory program code recorded thereon is disclosed. The program code is for generating positive and negative training samples. The program code is executed by a processor and includes program code to identify false positive images of an object based on multiple mages of an environment. The program code also includes program code to generate positive training samples from a set of images of the object. The program code further includes program code to generate a negative training sample from the false positive image. The program code still further includes program code to train an object detection system based on the positive training samples and the negative training sample.

Another aspect of the present disclosure is directed to an apparatus for generating positive and negative training samples. The apparatus having a memory and one or more processors coupled to the memory. The processor(s) is configured to identify false positive images of an object based on multiple mages of an environment. The processor (s) is also configured to generate positive training samples from a set of images of the object. The processor(s) is further configured to generate a negative training sample from the false positive image. The processor(s) still further configured to train an object detection system based on the positive training samples and the negative training sample.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Conventional systems (e.g., object detection network) that perform visual object classification generate false positive and false negative detections. The false positive and false negative detections reduce an accuracy of the detections. A system or method for visual object detection may be combined with a system or method of estimating the detected object location to analyze the object locations. A detected visual object may be identified by a bounding box. The analysis of the object locations may be referred to as a clustering analysis.

Errors may be detected from the clustering analysis. Additionally, true object locations may be estimated based on the clustering analysis. The clustering analysis assumes a static environment and exploits this assumption to count the number of objects in the environment, improve the estimated true location of each object, and reject detections that are not part of a spatial cluster (e.g., false positive detection).

Additionally, or alternatively, objection location estimations may be analyzed using a probability density function. The probability density function (e.g., probability density analysis) does not assume a static environment. The probability density analysis does not use the clustering analysis, object counting, or erroneous detection estimation. In one configuration, a spatial and temporal search for an object may be performed based on the probability density analysis.

A robotic device may use one or more sensors to identify objects in an environment. The sensors may include a red-green-blue (RGB) camera, radio detection and ranging (RADAR) sensor, light detection and ranging (LiDAR) sensor, or another type of sensor. In an image captured by a sensor, a location of one or more identified object may be estimated. Each object's location estimate may be stored along with an estimation time stamp. The estimation time stamp identifies a time when the object was at an estimated location. In one configuration, three-dimensional (3D) object locations are determined by registering detection bounding box centroids with a point cloud produced by a depth camera.

Conventional object detection systems are trained with training samples. The training samples include positive and negative samples. The training samples may be labeled by a human. Manually labeling training samples is time consuming and error prone. It is desirable to improve object detection system by improving the process for generating training samples.

Conventional object detection systems may generate false positive and false negative location estimations. That is, for each object detected in a frame, some detections may be valid, while others may be invalid. The false positives and true positives may be used as positive and negative training samples for a machine learning system (e.g., machine learning model). An object detection system may be a type of machine learning system.

Aspects of the present disclosure are directed to using a density based clustering function to estimate the number of objects in the environment. The clustering function may be used to select positive and negative training samples. The estimate is based on an assumption that the observation density for true object locations will be greater than a high density threshold. Additionally, the observation density for false positive object locations will be less than a low density threshold.

In the current disclosure, for simplicity, a robotic device may be referred to as a robot. Additionally, the objects may include stationary and dynamic objects in an environment. The objects may include man-made objects (e.g., chairs, desks, cars, books, etc.), natural objects (e.g., rocks, trees, animals, etc.), and humans.

Figure 1:
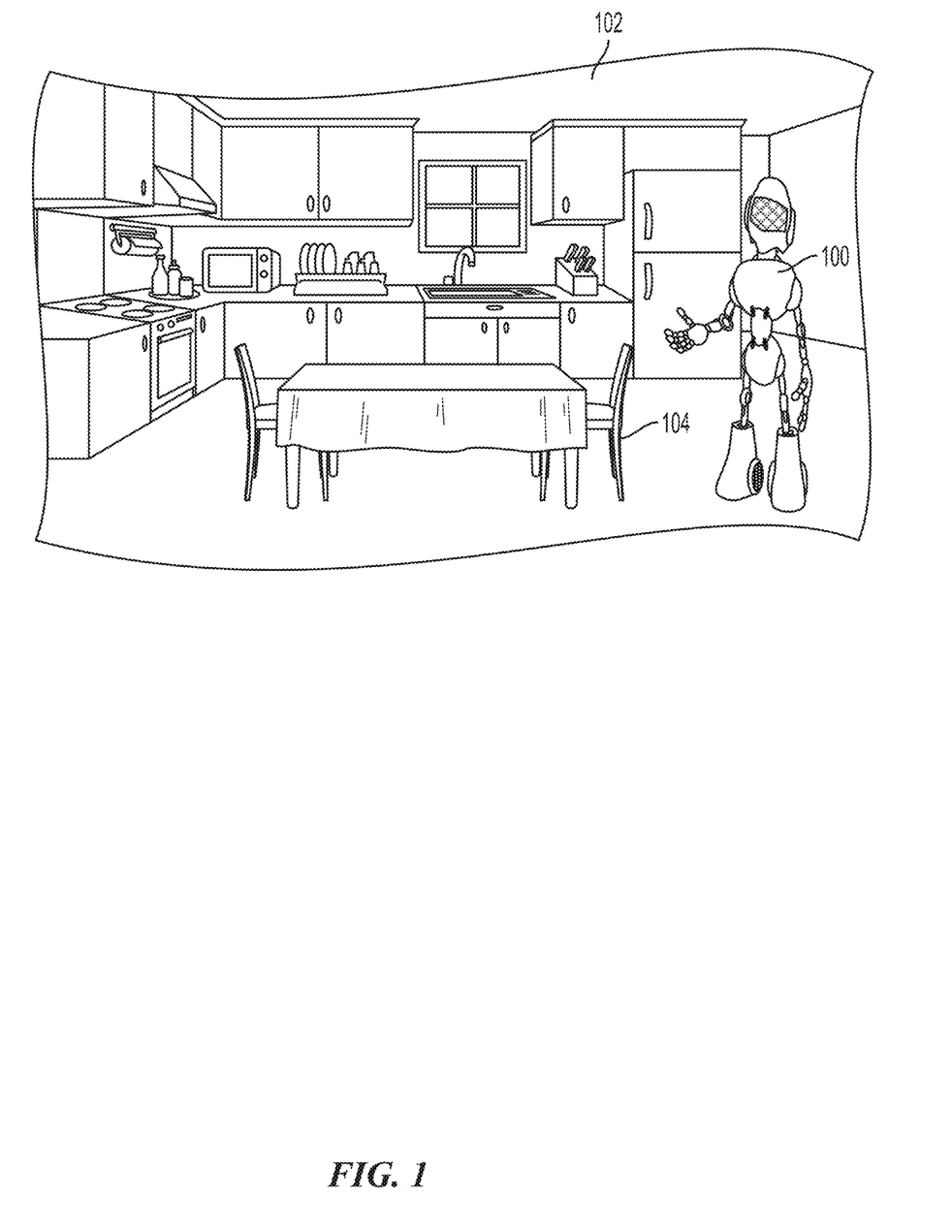
FIG. 1 illustrates an example of a robot in an environment according to aspects of the present disclosure.

FIG. 1 illustrates an example of a robot 100 in an environment 102, according to aspects of the present disclosure. In the example of FIG. 1, the robot 100 is a humanoid robot and the environment 102 is a kitchen. Aspects of the present disclosure are not limited to the humanoid robot. The robot 100 may be any type of autonomous or semi-autonomous device, such as a drone or a vehicle. Additionally, the robot 100 may be in any type of environment.

In one configuration, the robot 100 obtains one or more images of the environment 102 via one or more sensors of the robot 100. The robot 100 may localize one or more objects in each image. Localization refers to determining the location (e.g., coordinates) of the object within the image. In conventional object detection systems, a bounding box may be used to indicate the location of the object in the image. The localized objects may be one or more specific classes of objects, such as chairs 104, or all objects in the image. The objects may be localized via an object detection system, such as a pre-trained object detection neural network.

As discussed, one or more identified objects in an image (e.g., frame) may be localized. In one configuration, object location estimators are observed over time in an environment. Specifically, a clustering analysis may be applied to the object location estimators over various temporal windows (e.g., different time periods).

Figure 2:
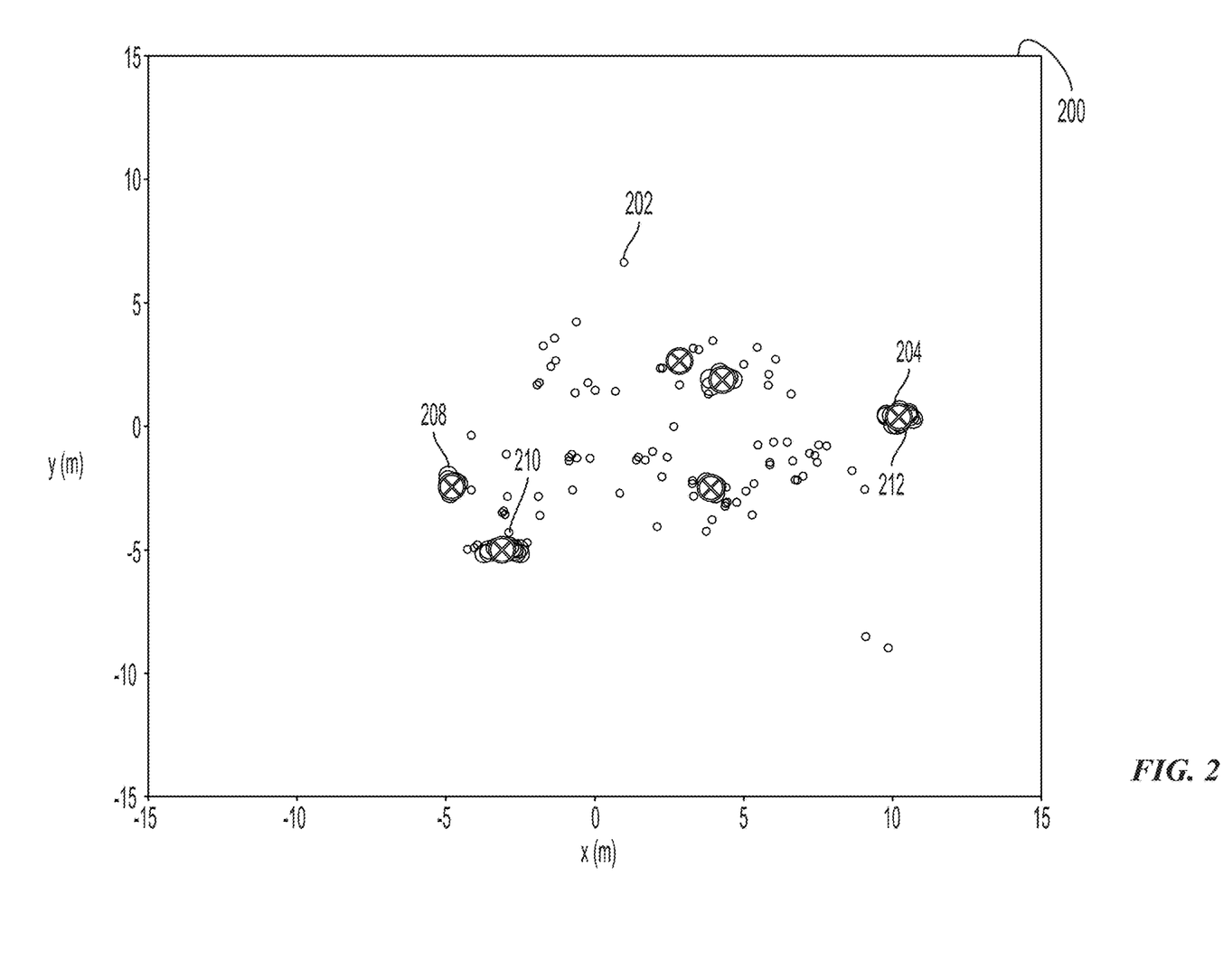
FIG. 2 illustrates an example of a clustering analysis map according to aspects of the present disclosure.

FIG. 2 illustrates an example of a clustering analysis map 200, according to aspects of the present disclosure. In the example of FIG. 2, object location estimators were observed over time in an environment. Each node 202, 208 identifies a location of an estimated location of an object in the environment. As shown in FIG. 2, some nodes 202 (e.g., non-clustered nodes 202) may not be associated with a cluster. Other nodes 208 (e.g., in-clustered nodes 208) may be clustered around a centroid 204. Non-clustered nodes 202 may be considered false positives. For brevity, labels are not provided for each non-clustered node 202 and in-clustered node 208 of FIG. 2.

In the example of FIG. 2, in-clustered nodes 208 may be edge nodes 210 or core nodes 212. A size (e.g., diameter) of an edge in-clustered node 210 is less than a size of core in-clustered node 212. Each edge in-clustered node 210 is associated with one neighbor node, where the distance of the neighbor node is less than a distance threshold. Each core in-clustered nodes 212 is associated with one neighbor node, where the distance of the neighbor node is less than a distance threshold. In one configuration, because the environment is a 3D environment, the centroid 204 is a 3D centroid. The centroid 204 may be associated with the object's true location.

In general, the clustered nodes 202 are location estimates of a same object or a same class of objects. For example, in an office, a location of office furniture may be less dynamic than a location of office supplies, such as pens or paper. The nodes 202 within an area of a location may be clustered. For example, the nodes 202 corresponding to a location of an office chair may form a cluster if the location is within a specific area over the course of the observations. The 3D centroid 204 (e.g., mean centroid) may be determined for each cluster.

For density based clustering, accuracy of the object location estimates may be determined based on the 3D centroid 204 of each cluster. Estimating an object's location based on the 3D centroid 204 may improve the accuracy of the estimation. Additionally, the object localization functions accuracy may be determined based on a 3D standard deviation of each cluster. The 3D mean of each cluster may be used to estimate an object's true location. The standard deviation may be used to determine the variance of a cluster. When the standard deviation is greater than a threshold, there may be uncertainty in an object's true location. The uncertainty in the object's location decreases when a variance in the standard deviation decreases. As such, the standard deviation correlates to an accuracy of the object's location.

Figure 3:
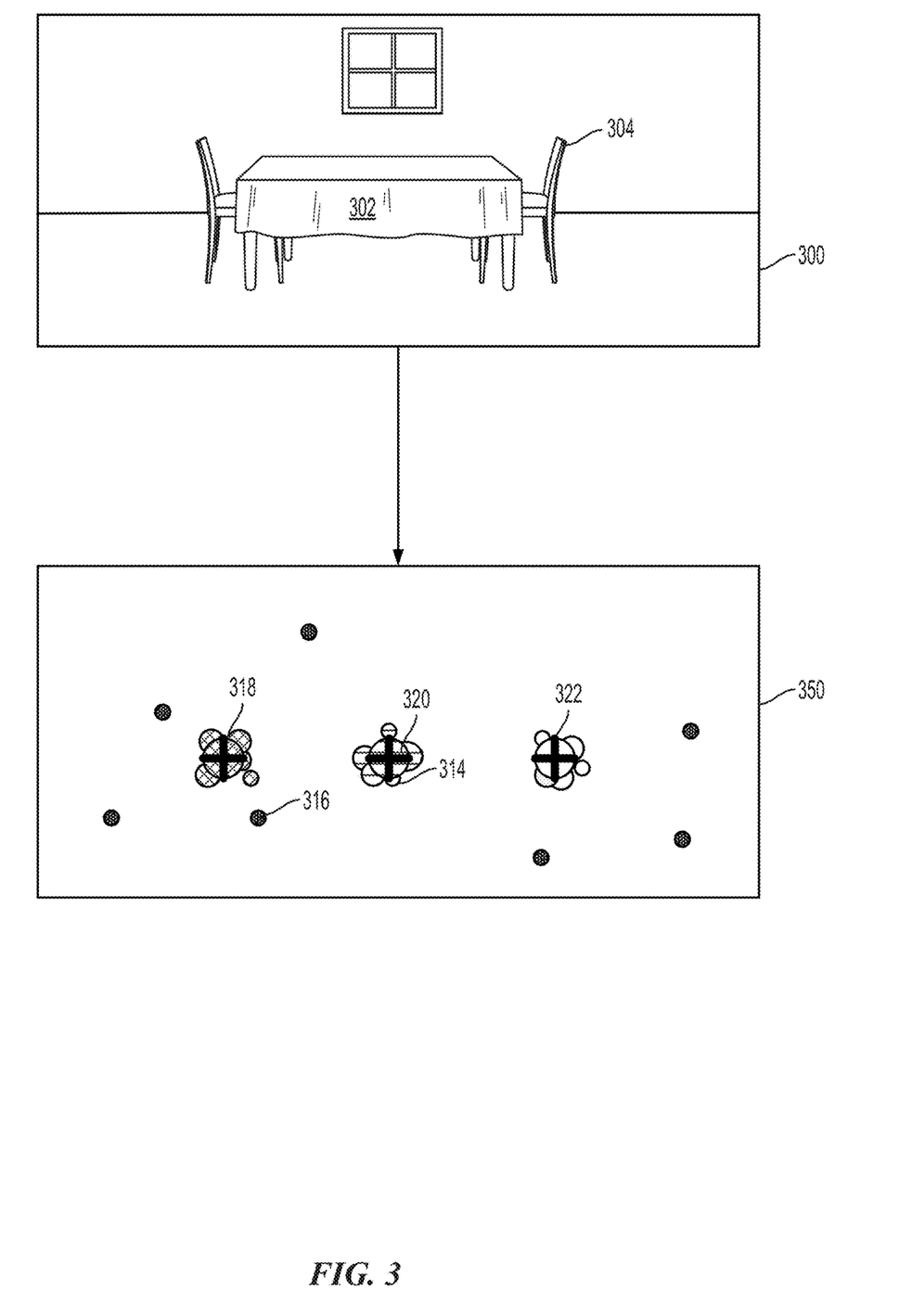
FIG. 3 illustrates an example of generating a clustering analysis map of object locations in an environment by observing object locations over time.

FIG. 3 illustrates an example of generating a clustering analysis map 350, according to aspects of the present disclosure. As shown in FIG. 3, the clustering analysis map 350 is based on observations of objects 302, 304 in an environment 300. In FIG. 3, a robot may observe the location of the objects (e.g., chairs 304 and table 302) in the environment 300 over a period of time. The robot may localize the locations of the chairs 304 and the table 302 for each observation.

After a number of observations, the robot may perform a clustering analysis to generate a clustering analysis map 350. The clustering analysis map 350 includes in-clustered nodes 314 and non-clustered nodes 316. The non-clustered nodes 316 are isolated observations from the environment 300. The in-clustered nodes 314 may be considered repeated observations of the same object 304, 302. Each centroid 318, 320, 322 is considered a true object location. For example, centroids 318, 322 correspond to the estimated true location of the chairs 304. Centroid 320 corresponds to the estimated true location of the table 302. The centroids 318, 320, 322 may be 3D centroids.

False positives are common in conventional convolutional neural network detectors. The clustering analysis (e.g., density based clustering) improves an estimate of a number of objects in a spatial environment, thereby reducing false positives. Density based clustering may be used to set density criteria for multiple detections in a similar, or same, location. As such, repeated observations of the same object may be considered. That is, in one configuration, density based clustering is used to consider multiple observations and discard isolated observations. Additionally, density based clustering may fuse repeated observations into unified object instances. Each cluster represents an instance of an object, such as a bottle or a plant.

In the example of FIG. 2, each cluster corresponds to one object based on multiple observations of the object. For example, hundreds or thousands of individual detections of the objects may be used for each cluster. Additionally, the clustering analysis may be used to determine a quality of the location estimations. That is, the clustering analysis may determine how well the location estimators are performing.

In one configuration, by observing object locations over time, a probability distribution of object locations in an environment may be generated. That is, the probability density function (e.g., probability density analysis) estimates a continuous distribution using the set of observations to represent the probability of finding an object at any given location on a map. Accordingly, the probability density function may be used to represent spatial and temporal knowledge about objects in the spatial environment.

A memory footprint of the data corresponding to the estimated probability density function is less than a memory footprint for data corresponding to conventional object localization systems. For example, conventional object localization systems may generate a 1 GB object observation log. In contrast, the estimated probability density function may be 50 KB. Due to the reduced memory footprint, the kernel density estimation may be transferred between robotic devices. As such, robotic devices may share knowledge about object locations in an environment.

As discussed, the probability density function analysis estimates a continuous distribution using all of the observations configurations. The probability distribution of object locations in an environment is generated by observing object locations over time. Random samples may be extracted from the probability distribution. A random sample from the distribution may have a higher likelihood of being in an area of high probability as opposed to an area of low probability. Additionally, evaluating the distribution over the map grid may provide a heatmap (e.g., costmap) showing areas of the map that are more likely to contain objects.

As another example, specific objects may correspond to specific high probability and low probability areas. For example, a first set of chairs are for a kitchen dining table, and a second set of chairs are for a formal dining table. In this example, the kitchen is a high probability area for the first set of chairs and an area outside of the kitchen is a low probability area. For example, the formal dining room may be a low probability area for the first set of chairs. Additionally, the formal dining room is a high probability area for the second set of chairs and the kitchen is a low probability area for the second set of chairs.

Figure 4A:
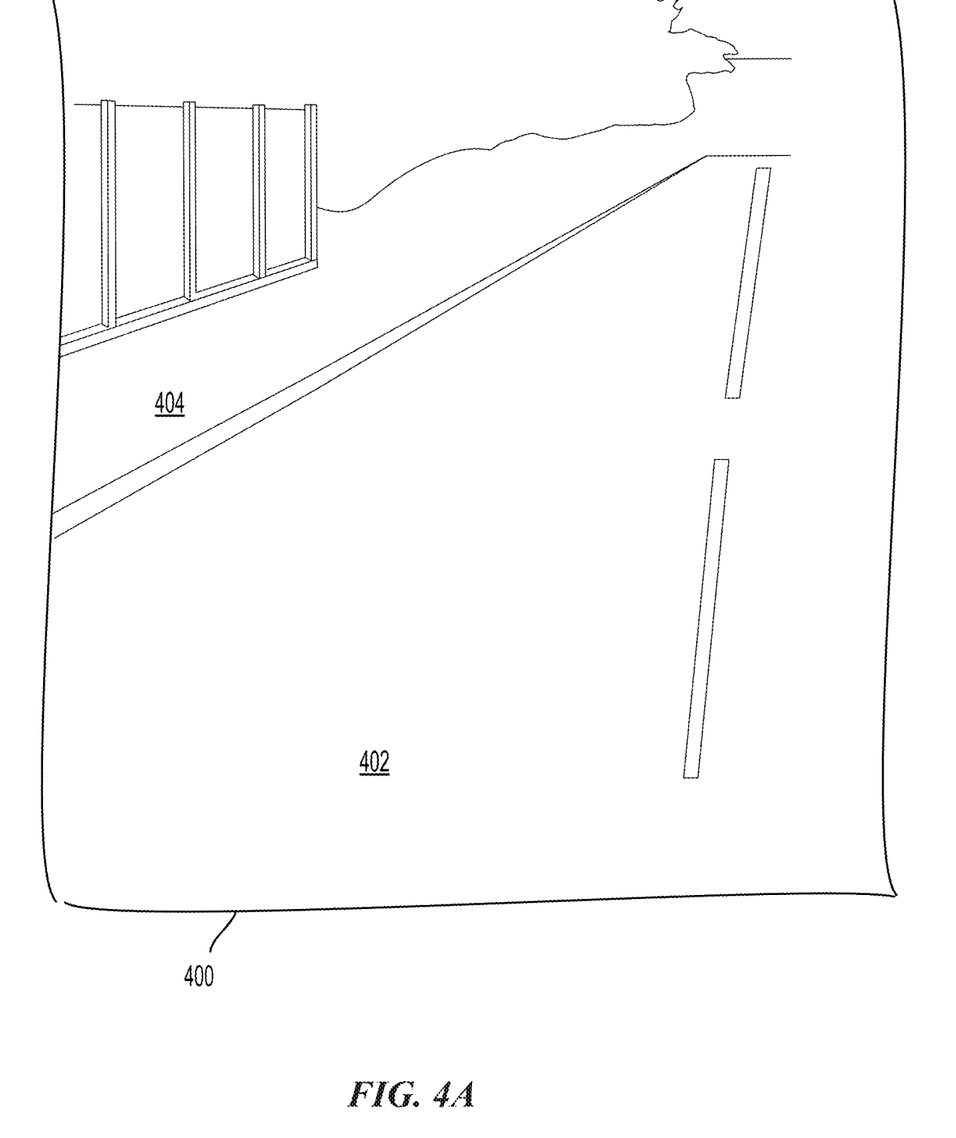
FIG. 4A illustrates an example of an environment according to aspects of the present disclosure.

FIG. 4A illustrates an image of an environment 400, according to aspects of the present disclosure. In the example of FIG. 4A, the environment includes a road 402 and a sidewalk 404. In one configuration, a robot observes the environment 400 over time. For example, the robot may observe the environment 400 over a twenty-four hour period. Based on the observations, the robot generates a probability distribution of object locations in the environment 400. The objects may be humans or another type of object. The probability distributions may be used to generate a costmap.

Figure 4B:
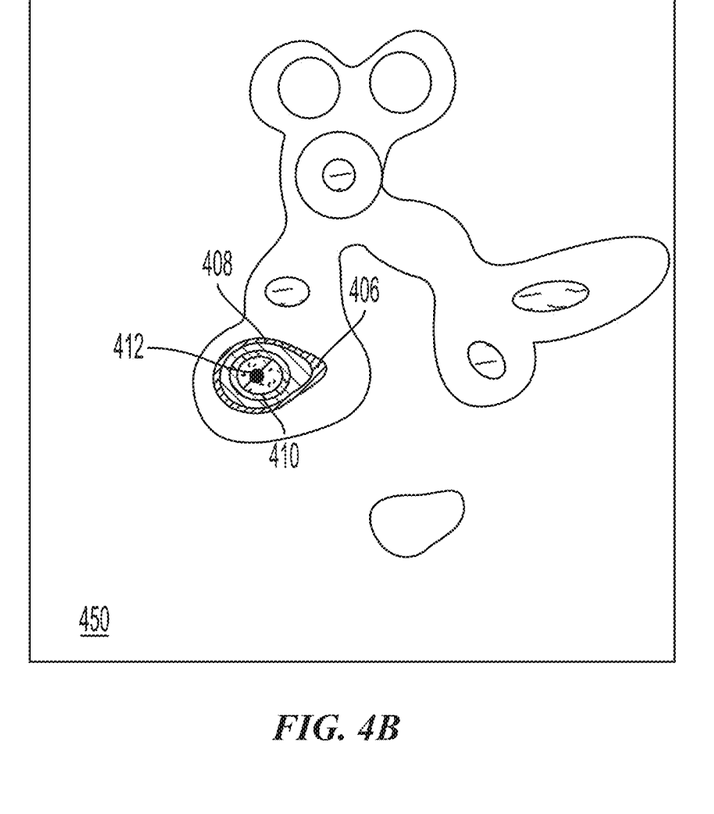
FIG. 4B illustrate an example of a costmap according to aspects of the present disclosure.

As shown in FIG. 4B, a costmap 450 may be generated based on a probability density analysis of objects in an environment. The costmap 450 may be based on a 2D or 3D probability density function. As such, any type of map, such as an ego view or top-down view, may be generated.

In the costmap 450, low probability areas may be distinguished from high probability areas. Each area may be assigned a probability value. The probability value, or probability value range, may be visualized by color or other visual representation. For example, a color or shading of low probability areas may be different from high probability areas. Different granularity levels may be assigned to an occupancy probability. For example, as shown in FIG. 4B, the probability areas may be low 404, mild 406, medium 408, high 410, very high 412. The probability of an object being present at a location may be determined from a value assigned to the location in the costmap. The probability of an object being present at a location may be referred to as an object probability.

A neural network (e.g., machine learning system), such as a convolutional neural network, may be trained with positive and negative training samples. For example, when training the machine learning system to detect a cat, the training samples may include images of cats (e.g., positive training samples) and images of other animals (e.g., negative training samples). In conventional machine learning systems, a human may manually label the positive and negative training samples. For example, when training the machine learning system to identify a cat, the human may manually label images with cats as positive images and manually label the images of other animals as negative images. The human may also localize the cat (e.g., draw a bounding box around the cat).

The process of obtaining positive and negative training samples is time consuming and prone to error. It is desirable to improve the process for obtaining positive and negative training samples. According to aspects of the present disclosure, a robot autonomously captures and selects images that may be used for training a machine learning system to detect objects without human analysis.

As discussed, conventional object detection networks generate false positive and false negative detections. According to aspects of the present disclosure, a density clustering analysis rejects false positives and false negatives. As such, aspects of the present disclosure improve an accuracy of the estimated number of objects in an environment. Additionally, the accuracy of the estimated true location of the objects is improved.

In one configuration, after estimating the number of objects and their true locations, a robot may use the gathered information to improve training. In this configuration, the robot may obtain additional images of an object from varying viewing angles and/or varying distances. The additional images of the object may be used as positive training samples. Bounding boxes may be added to additional images of the object. The images of negative examples which led to previous false positive detections may be used as negative training samples. The new positive and negative training samples may be added to training data to improve the object detection network.

Figure 4C:
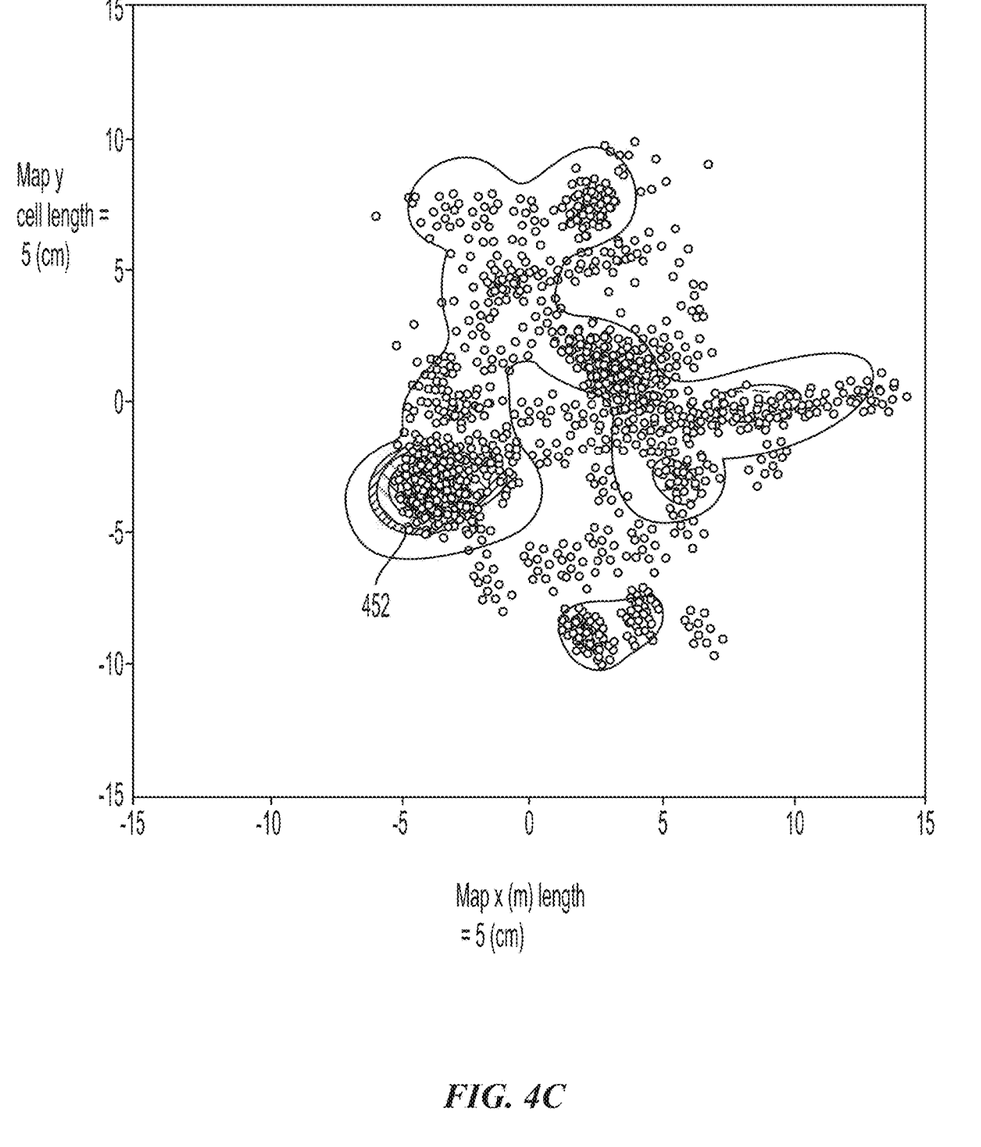
FIG. 4C illustrates an example of a costmap with object locations integrated over a time period according to aspects of the present disclosure.

FIG. 4C illustrates an example of the costmap 450 with object locations 452 integrated over a time period. In the example of FIG. 4C, the time period may be a twenty-four hour period. Other time periods, such as hours, days, weeks, months, etc., are also contemplated.

In the example of FIG. 4C, each object location 452 represents the location of an object, such as a human. The costmap 450 is generated based on a probability density analysis. As discussed, the probability density analysis estimates a continuous distribution using all of the observations in order to represent the probability of finding an object at any given location on the costmap 450. The costmap may be considered a Gaussian mixture model with some number of 2D Gaussian functions fit to the data.

Figure 5:
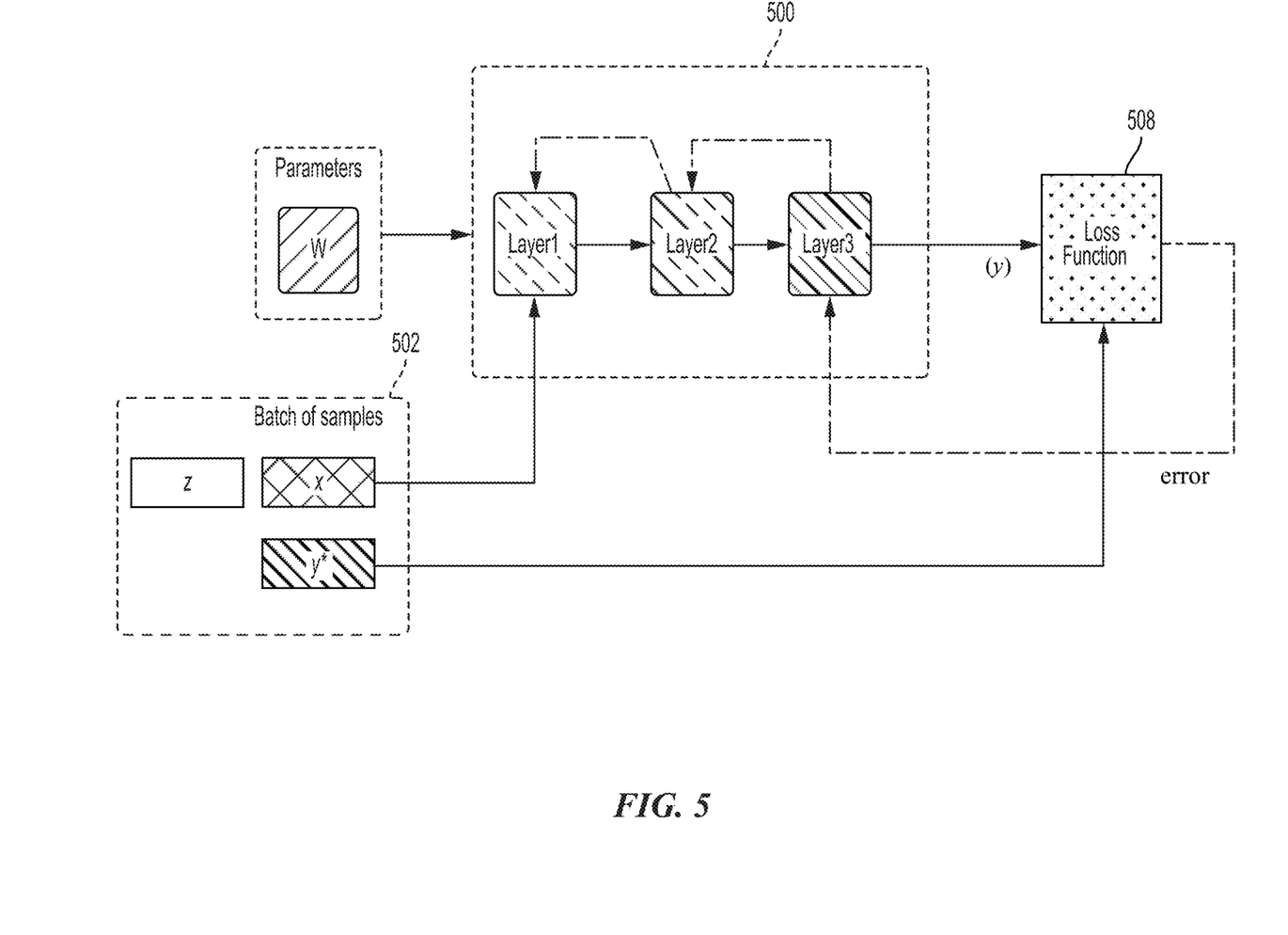
FIG. 5 illustrates a flow diagram for training a machine learning model according to an aspect of the present disclosure.

FIG. 5 illustrates a flow diagram for training a machine learning model 500, according to an aspect of the present disclosure. In one configuration, high probability images (x) (e.g., positive samples) and low probability images (z) (e.g., negative samples) are stored in a data source 502, such as a training server. The data source may also store ground truth samples (y*) corresponding to one or more objects in the high probability images (x).

The machine learning model 500 may be initialized with a set of parameters (w). The parameters (w) may be used by layers of the machine learning model 500, such as layer 1, layer 2, and layer 3, of the machine learning model 500 to set weights and biases. Layer 3 may be a fully connected layer. During training, the machine learning model 500 receives high probability images (x) and low probability images (z) to label detected objects.

The machine learning model 500 outputs a predicted label (y) for one or more objects in each high probability image (x) and low probability image (z). The predicted labels (y) are received at a loss function 508. The loss function 508 compares the predicted labels (y) to the ground truth actions (y*). The prediction error is the difference (e.g., loss) between the predicted label (y) and the ground truth action (y*). The prediction error is output from the loss function 508 to the machine learning model 500. The error is back-propagated through the machine learning model 500 to update the parameters. The training may be performed during an offline phase of the machine learning model 500.

Figure 6:
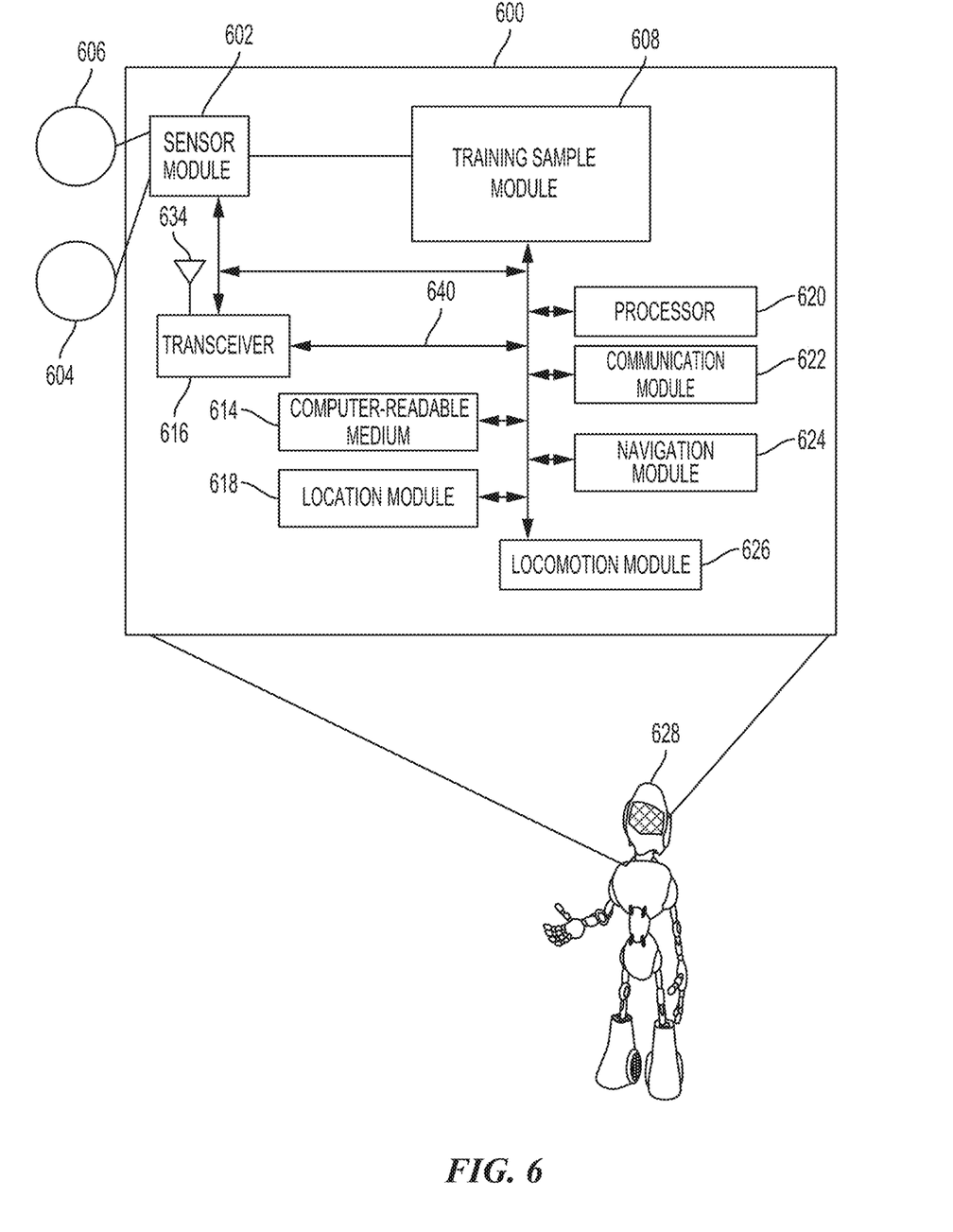
FIG. 6 is a diagram illustrating an example of a hardware implementation for a training sample selection system according to aspects of the present disclosure.

FIG. 6 is a diagram illustrating an example of a hardware implementation for a training sample selection system 600, according to aspects of the present disclosure. The training sample selection system 600 may be a component of a vehicle, a robotic device, or another device. For example, as shown in FIG. 6, the training sample selection system 600 is a component of a robot 628.

Aspects of the present disclosure are not limited to the training sample selection system 600 is a component of the robot 628, as other devices, such as a bus, boat, drone, vehicle, or stationary device, are also contemplated for using the training sample selection system 600. The robot 628 may operate in at least an autonomous operating mode and a manual operating mode. Other operating modes, such as semi-autonomous are also contemplated.

The training sample selection system 600 may be implemented with a bus architecture, represented generally by a bus 640. The bus 640 may include any number of interconnecting buses and bridges depending on the specific application of the training sample selection system 600 and the overall design constraints. The bus 640 links together various circuits including one or more processors and/or hardware modules, represented by a processor 620, a communication module 622, a location module 618, a sensor module 602, a locomotion module 626, a navigation module 624, and a computer-readable medium 614. The bus 640 may also link various other circuits such as timing sources, peripherals, voltage regulators, and power management circuits, which are well known in the art, and therefore, will not be described any further.

The training sample selection system 600 includes a transceiver 616 coupled to the processor 620, the sensor module 602, a training sample selection module 608, the communication module 622, the location module 618, the locomotion module 626, the navigation module 624, and the computer-readable medium 614. The transceiver 616 is coupled to an antenna 644. The transceiver 616 communicates with various other devices over a transmission medium. For example, the transceiver 616 may receive commands via transmissions from a user or a remote device.

The training sample selection system 600 includes the processor 620 coupled to the computer-readable medium 614. The processor 620 performs processing, including the execution of software stored on the computer-readable medium 614 providing functionality according to the disclosure. The software, when executed by the processor 620, causes the training sample selection system 600 to perform the various functions described for a particular device, such as the robot 628, or any of the modules 602, 608, 614, 616, 618, 620, 622, 624, 626. The computer-readable medium 614 may also be used for storing data that is manipulated by the processor 620 when executing the software.

The sensor module 602 may be used to obtain measurements via different sensors, such as a first sensor 606 and a second sensor 604. The first sensor 606 may be a vision sensor, such as a stereoscopic camera or a red-green-blue (RGB) camera, for capturing 2D images. The second sensor 604 may be a ranging sensor, such as a light detection and ranging (LiDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 604, 606.

The measurements of the first sensor 606 and the second sensor 604 may be processed by one or more of the processor 620, the sensor module 602, the training sample selection module 608, the communication module 622, the location module 618, the locomotion module 626, the navigation module 624, in conjunction with the computer-readable medium 614 to implement the functionality described herein. In one configuration, the data captured by the first sensor 606 and the second sensor 604 may be transmitted to an external device via the transceiver 616. The first sensor 606 and the second sensor 604 may be coupled to the robot 628 or may be in communication with the robot 628.

The location module 618 may be used to determine a location of the robot 628. For example, the location module 618 may use a global positioning system (GPS) to determine the location of the robot 628. The communication module 622 may be used to facilitate communications via the transceiver 616. For example, the communication module 622 may be configured to provide communication capabilities via different wireless protocols, such as WiFi, long term evolution (LTE), 4G, etc. The communication module 622 may also be used to communicate with other components of the robot 628 that are not modules of the training sample selection system 600.

The locomotion module 626 may be used to facilitate locomotion of the robot 628. As another example, the locomotion module 626 may be in communication with one or more power sources of the robot 628, such as a motor and/or batteries. The training sample selection system 600 also includes the navigation module 624 for planning a route or controlling the locomotion of the robot 628, via the locomotion module 626. The modules may be software modules running in the processor 620, resident/stored in the computer-readable medium 614, one or more hardware modules coupled to the processor 620, or some combination thereof.

The training sample selection module 608 may be in communication with the sensor module 602, the transceiver 616, the processor 620, the communication module 622, the location module 618, the locomotion module 626, the navigation module 624, and the computer-readable medium 614. In one configuration, the training sample selection module 608 determines false positive images based on a clustering analysis of an environment. The false positive images may be selected for negative training samples. The clustering analysis may be performed by the processor 620 and/or the computer-readable medium 614 based on images captured via the first sensor 606 and/or second sensor 604.

Additionally, the training sample selection module 608 may control the first sensor 606 and/or second sensor 604 to capture additional images of objects at their most likely true spatial location. The additional images may be captured at varying distances and/or varying angles. The most likely true spatial location of objects may be determined from a clustering analysis. The additional images may be used for positive training samples.

The positive and negative training samples may be used to improve an object detector module (not shown). The object detector module may be an artificial neural network. The object detector module may be a component of the processor 620 and/or the computer-readable medium 614. Alternatively, the object detector module may be a separate component in communication with the processor 620 and/or the computer-readable medium 614.

Figure 7:
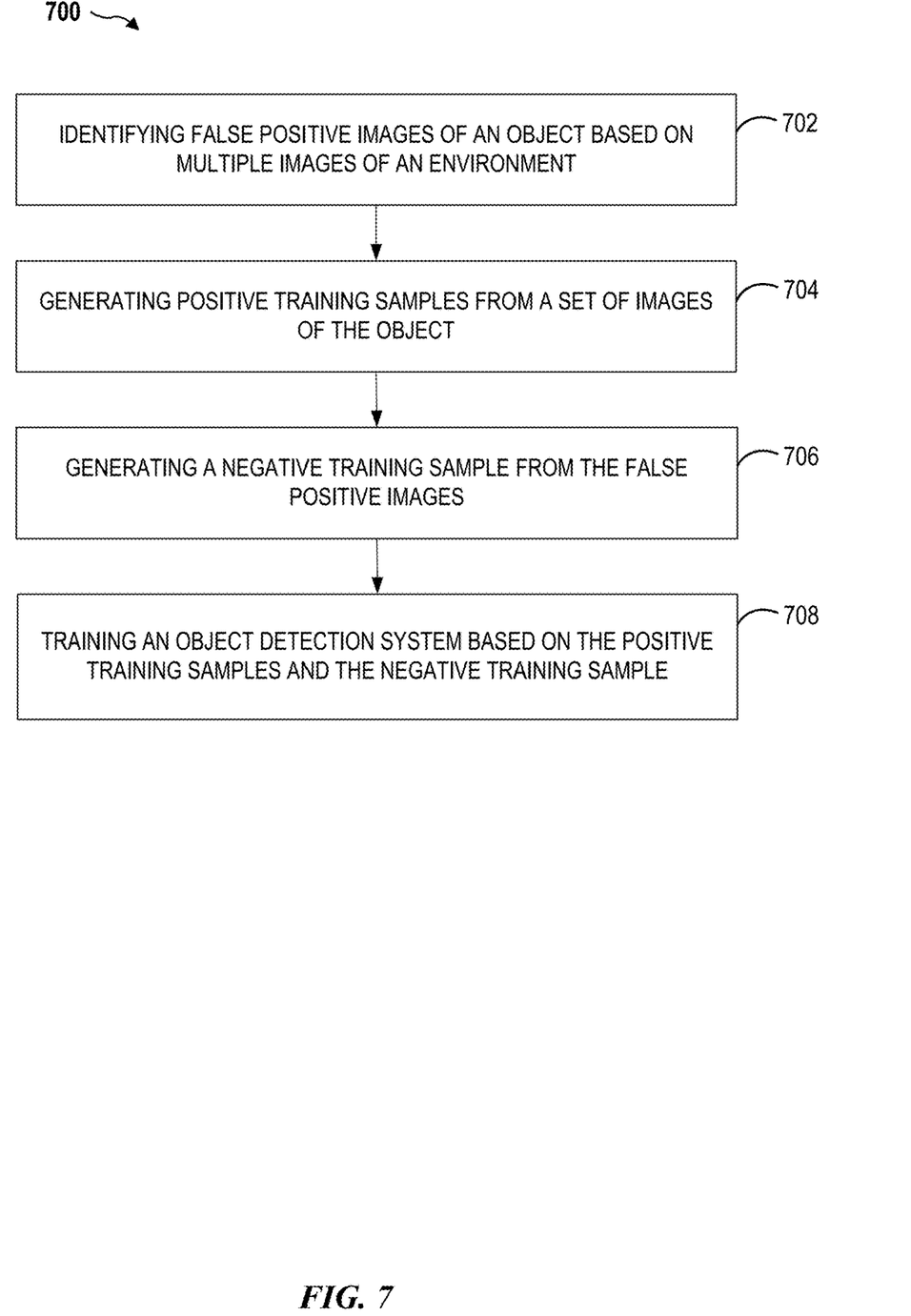
FIG. 7 illustrates a flow diagram for a method for selecting positive and negative training samples according to aspects of the present disclosure.

FIG. 7 illustrates a flow diagram 700 for generating positive and negative training samples according to aspects of the present disclosure. As shown in FIG. 7, at block 702, a training sample selection system identifies false positive images of an object based on multiple images of an environment. The environment may be a static environment.

In one configuration, a density clustering analysis is performed using the multiple images. The density clustering analysis may be referred to as a clustering analysis. The density clustering analysis estimates a number of instances of objects in the environment. The number of instances may be for all objects in the environment, a subset of all objects, or a specific type of object.

Additionally, the density clustering analysis estimates a true spatial location (e.g., most likely spatial location) of each object in the environment. Aspects of the present disclosure are not limited to estimating the true spatial location of each object. The true spatial location may be determined for one object or a subset of all objects in the environment. A 3D mean of clusters may be calculated to estimate the true spatial location of each object.

At block 704, the training sample selection system generates positive training samples from a set of images of the object. The set of images may be different from the multiple images of the environment. The set of images may vary in angle and/or distance. At block 706, the training sample selection system generates a negative training sample from the false positive image. A number of negative training samples may be based on a number of false positive images. One negative training sample may be generated for each false positive image. Additionally, only a subset of all false positive images may be used for generating negative training samples.

At block 708, the training sample selection system trains an object detection system based on the positive training samples and the negative training sample. The positive and negative samples may be added to an existing training set or be a new training set. The training may be re-training previously trained object detection system. Alternatively, the training may be training an untrained object detection system. The object detection system may be an artificial neural network. The object detection system may be a component of a robotic device, such as a robot, an autonomous vehicle, a drone, etc. The training sample selection system may be a component of the object detection system. Alternatively, the training sample selection system may be distinct from the object detection system.

The training samples may be used for one or more object detection systems. For example, the training samples (e.g., positive and negative samples) may be shared across multiple object detection systems. In this example, the training samples may be shared from one robotic device to other robotic devices. As another example, the training samples may be sent from an external device (e.g., cloud server) to one or more robotic devices.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for training an object detection system, comprising:
    estimating a first location of a first object in an environment based on a density cluster map generated from a plurality of images of the environment;
    generating one or more negative training samples of the first object in the environment based on the plurality of images, each of the one or more negative training samples corresponding to a second object at a second location in the environment that is different than the estimated first location of the first object;
    generating positive training samples from a set of images of the first object; and
    training the object detection system to detect the first object based on the positive training samples and the negative training sample.

2. The method of claim 1, further comprising estimating a number of instances of the first object in the environment based on the density cluster map.

3. The method of claim 1, wherein the estimated location of the first object corresponds to a three-dimensional mean of a cluster of nodes in the density cluster map.

4. The method of claim 1, wherein each image of the set of images depicts the first object at a different angle and/or a different distance relative to an image capturing device.

5. The method of claim 1, wherein the environment is a static environment.

6. The method of claim 1, further comprising:
    adding the positive training samples and the negative training samples to an existing set of training samples; and
    training the object detection system on the existing set of training samples.

7. The method of claim 1, wherein the second object is a same type of object as the first object.

8. An apparatus for training an object detection system, comprising:
    at least one processor; and
    at least one memory coupled with the at least one processor and storing instructions operable, when executed by the processor, to cause the apparatus to:
        estimate a first location of a first object in an environment based on a density cluster map generated from a plurality of images of the environment;
        generate one or more negative training samples of the first object in the environment based on the plurality of images, each of the one or more negative training samples corresponding to a second object at a second location in the environment that is different than the estimated first location of the first object;
        generate positive training samples from a set of images of the first object; and
        train the object detection system to detect the first object based on the positive training samples and the negative training sample.

9. The apparatus of claim 8, wherein execution of the instructions further cause the apparatus to estimate a number of instances of the first object in the environment based on the density cluster map.

10. The apparatus of claim 8, wherein the estimated location of the first object corresponds to a three-dimensional mean of a cluster of nodes in the density cluster map.

11. The apparatus of claim 8, wherein each image of the set of images depicts the first object at a different angle and/or a different distance relative to an image capturing device.

12. The apparatus of claim 8, wherein the environment is a static environment.

13. The apparatus of claim 8, wherein execution of the instructions further cause the apparatus to:
    add the positive training samples and the negative training samples to an existing set of training samples; and
    train the object detection system on the existing set of training samples.

14. The apparatus of claim 8, wherein the second object is a same type of object as the first object.

15. A non-transitory computer-readable medium having program code recorded thereon for training an object detection system, the program code executed by a processor and comprising:
    program code to estimate a first location of a first object in an environment based on a density cluster map generated from a plurality of images of the environment;
    program code to generate one or more negative training samples of the first object in the environment based on the plurality of images, each of the one or more negative training samples corresponding to a second object at a second location in the environment that is different than the estimated first location of the first object;
    program code to generate positive training samples from a set of images of the first object; and program code to train the object detection system to detect the first object based on the positive training samples and the negative training sample.

16. The non-transitory computer-readable medium of claim 15, wherein the program code further comprises program code to estimate a number of instances of the first object in the environment based on the density cluster map.

17. The non-transitory computer-readable medium of claim 15, wherein the estimated location of the first object corresponds to a three-dimensional mean of a cluster of nodes in the density cluster map.

18. The non-transitory computer-readable medium of claim 15, wherein each image of the set of images depicts the first object at a different angle and/or a different distance relative to an image capturing device.

19. The non-transitory computer-readable medium of claim 15, wherein the environment is a static environment.

20. The non-transitory computer-readable medium of claim 15, wherein the program code further comprises:
 program code to add the positive training samples and the negative training samples to an existing set of training samples; and
 program code to train the object detection system on the existing set of training samples.

* * * * *